US011838416B2

(12) United States Patent
Ohashi et al.

(10) Patent No.: US 11,838,416 B2
(45) Date of Patent: Dec. 5, 2023

(54) COMMUNICATION SYSTEM AND CONTROL DEVICE

(71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 204 days.

(21) Appl. No.: 17/600,750

(22) PCT Filed: Apr. 3, 2020

(86) PCT No.: PCT/JP2020/015348
§ 371 (c)(1),
(2) Date: Oct. 1, 2021

(87) PCT Pub. No.: WO2020/209201
PCT Pub. Date: Oct. 15, 2020

(65) Prior Publication Data
US 2022/0191022 A1   Jun. 16, 2022

(30) Foreign Application Priority Data

Apr. 12, 2019  (JP) ................................. 2019-076300
Mar. 24, 2020  (JP) ................................. 2020-052409

(51) Int. Cl.
*H04L 9/16*    (2006.01)
*B60R 25/24*   (2013.01)
*H04L 9/32*    (2006.01)

(52) U.S. Cl.
CPC ................ *H04L 9/16* (2013.01); *B60R 25/24* (2013.01); *H04L 9/32* (2013.01); *H04L 2209/805* (2013.01); *H04L 2209/84* (2013.01)

(58) Field of Classification Search
CPC ....... H04L 9/083; H04L 9/088; H04L 9/0891; H04L 9/16; H04L 9/32; H04L 9/3226;
(Continued)

(56) References Cited

U.S. PATENT DOCUMENTS 5,600,720 A     2/1997 Iwamura et al.
5,784,464 A *   7/1998 Akiyama .............. H04L 9/0891
                                                    713/185
(Continued)

FOREIGN PATENT DOCUMENTS

JP      07-36672       2/1995
JP      2007-049759    2/2007
(Continued)

OTHER PUBLICATIONS

International Search Report issued in International Bureau of WIPO Patent Application No. PCT/JP2020/015348, dated Jul. 21, 2020, along with an English translation thereof.
(Continued)

*Primary Examiner* — Minh Dinh
(74) *Attorney, Agent, or Firm* — GREENBLUM & BERNSTEIN, P.L.C.

(57) ABSTRACT

[Object] To provide a communication system that makes it possible to improve security.
[Solution] Provided is a communication system including: a first device configured to transmit encrypted information that is encrypted by using a first encryption key; and a second device configured to execute a predetermined process based on the encrypted information obtained from the first device, and a second encryption key that is common to the first encryption key. The first device includes a first change section configured to change the first encryption key in the case where a first condition is satisfied. The second device includes a second change section configured to
(Continued)

change the second encryption key in the case where a second condition is satisfied, the second condition being common to the first condition.

11 Claims, 4 Drawing Sheets

(58) Field of Classification Search
CPC ............ H04L 9/3242; H04L 2209/805; H04L 2209/84; G07C 9/00309; G07C 2009/00412; B60R 25/24
See application file for complete search history.

(56) References Cited

U.S. PATENT DOCUMENTS

| | | |
|---|---|---|
| 6,058,476 A | 5/2000 | Matsuzaki et al. |
| 9,306,741 B1* | 4/2016 | Brainard ............... H04L 9/0861 |
| 2015/0095997 A1* | 4/2015 | Mabuchi ................. H04L 67/12 726/6 |
| 2018/0034794 A1* | 2/2018 | Pandey ................. H04L 9/0872 |
| 2018/0076959 A1* | 3/2018 | Komano .................. G09C 1/00 |
| 2018/0262336 A1 | 9/2018 | Fujiwara et al. |

FOREIGN PATENT DOCUMENTS

| | | |
|---|---|---|
| JP | 2009-278565 | 11/2009 |
| JP | 2013-048374 | 3/2013 |
| JP | 2018-145764 | 9/2018 |

OTHER PUBLICATIONS

Written Opinion issued in International Bureau of WIPO Patent Application No. PCT/JP2020/015348, dated Jul. 21, 2020.

* cited by examiner

COMMUNICATION SYSTEM AND CONTROL DEVICE

TECHNICAL FIELD

The present invention relates to a communication system and a control device.

BACKGROUND ART

For example, with regard to vehicles, communication systems have been known. Such a communication system control a vehicle through wireless communication with a terminal and an in-vehicle device installed in the vehicle. In such a communication system, the in-vehicle device receives authentication information such as a key code that has been transmitted from the terminal and that is necessary for authentication, and then the communication system conducts key verification by checking the authentication information received by the in-vehicle device against authentication information registered on the in-vehicle device. If the key verification has succeeded, this permits actuation of the vehicle.

In addition, such communication systems include a communication system that performs encrypted communication as wireless communication between the terminal and the in-vehicle device to deal with inappropriate interception of authentication information that is wirelessly transmitted to the vehicle. Through the encrypted communication, a transmission source encrypts communication data by using an encryption key owned by the transmission source and then transmits the encrypted communication data to a communications partner. When the partner receives the communication data, the partner decrypts the received communication data by using an encryption key owned by the partner, and then accepts the communication data. For example, Patent Literature 1 or the like discloses a technology related to such encrypted communication. Examples of this kind of encrypted communication include a common key cryptosystem in which a transmission source and a communication partner own a common encryption key.

CITATION LIST

Patent Literature

Patent Literature 1: JP 2007-49759A

DISCLOSURE OF INVENTION

Technical Problem

However, the encrypted communication has a problem that if the common key is cracked this deteriorates security. Accordingly, the present invention is made in view of the aforementioned issue, and an object of the present invention is to provide a novel and improved technology that makes it possible to improve security.

Solution to Problem

To solve the above-described problems, according to an aspect of the present invention, there is provided a communication system including: a first device configured to transmit encrypted information that is encrypted by using a first encryption key; and a second device configured to execute a predetermined process based on the encrypted information obtained from the first device, and a second encryption key that is common to the first encryption key. The first device includes a first change section configured to change the first encryption key in the case where a first condition is satisfied. The second device includes a second change section configured to change the second encryption key in the case where a second condition is satisfied, the second condition being common to the first condition.

In addition, to solve the above-described problems, according to another aspect of the present invention, there is provided a control device capable of communicating with a first device and a second device. When the first device transmits encrypted information that is encrypted by using a first encryption key to the second device, the second device executes a predetermined process based on the encrypted information and a second encryption key that is common to the first encryption key. The control device includes a key control section configured to control change of the first encryption key and the second encryption key in the case where a predetermined condition is satisfied.

Advantageous Effects of Invention

As described above, according to the present invention, it is possible to provide the technology that makes it possible to improve security.

MODE(S) FOR CARRYING OUT THE INVENTION

Hereinafter, referring to the appended drawings, preferred embodiments of the present invention will be described in detail. Note that, in this specification and the appended drawings, structural elements that have substantially the same function and structure are denoted with the same reference signs, and repeated explanation of these structural elements will be omitted.

1. Embodiment

Hereinafter, an embodiment of a communication system will be described with reference to FIG. 1 to FIG. 4.

1.1. Configuration Example

Figure 1:
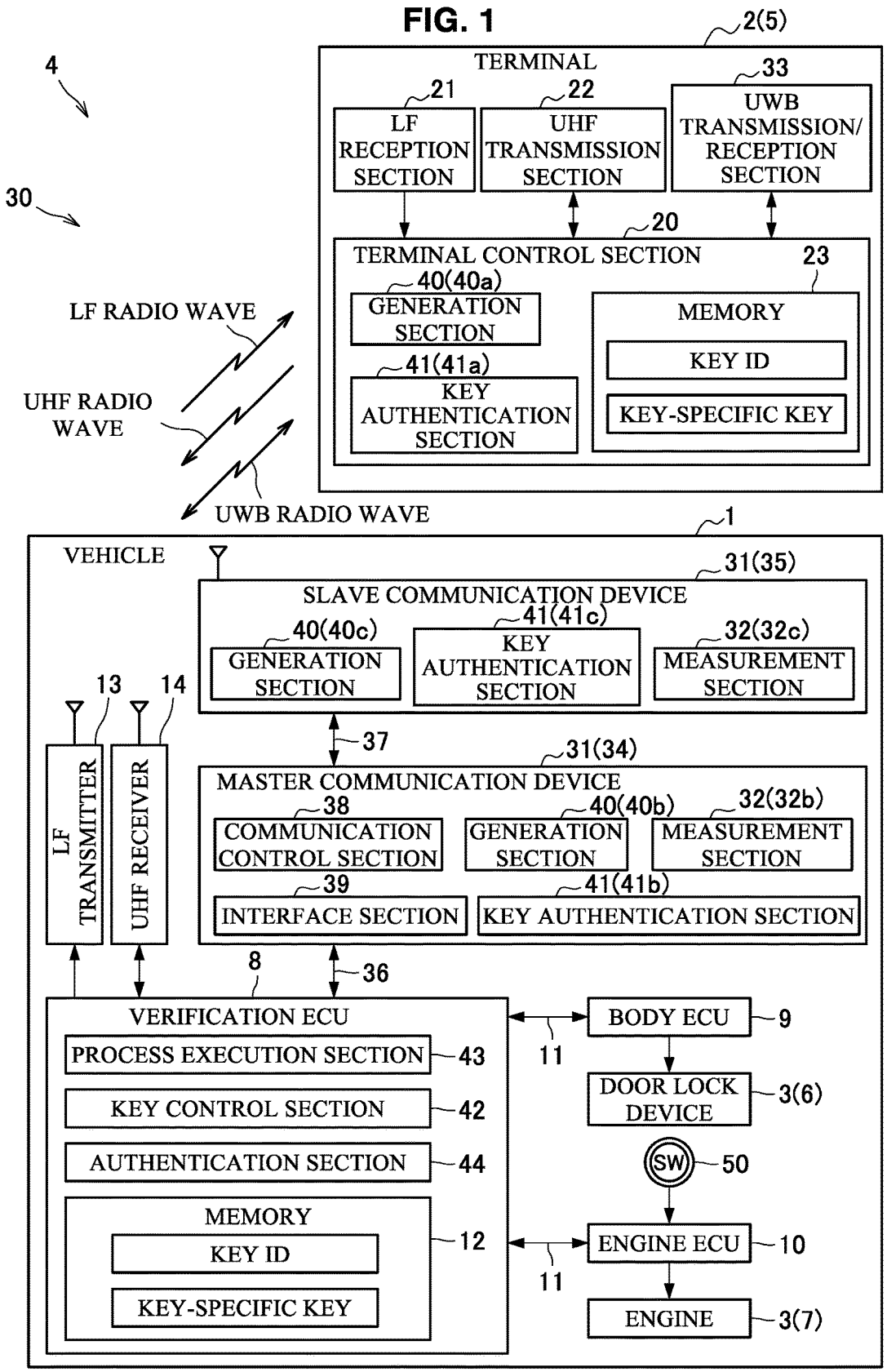
FIG. 1 is a block diagram illustrating a configuration of a distance measurement system installed in an electronic key system.

A configuration example of the communication system according to the present embodiment will be described with reference to FIG. 1. As illustrated in FIG. 1, the communication system according to the present embodiment includes an electronic key system 4. The electronic key system 4 controls whether or not to actuate an in-vehicle device 3 by wirelessly confirming whether or not a terminal 2 is valid (by authenticating the terminal 2). More specifically, the electronic key system 4 according to this example is a smart verification system that executes ID verification (hereinafter, also referred to as "smart verification") for checking a key ID (ID information) received by one of a vehicle 1 and the terminal 2 against a key ID registered on the one of the vehicle 1 and the terminal 2 in the case where the other of the vehicle 1 and the terminal 2 transmits the key ID necessary for authentication and the one of the vehicle 1 and the terminal 2 receives the key ID.

This example mainly focuses on the case where the vehicle 1 executes the smart verification, and details thereof will be described later. However, it is also possible for the terminal 2 to execute the smart verification. In addition, the smart verification is an example of authentication of the terminal 2 through wireless communication. Therefore, the method of authenticating the terminal 2 is not limited to the smart verification. In the case where the electronic key system 4 executes the smart verification, the terminal 2 is desirably an electronic key 5 as illustrated in FIG. 1. For example, the electronic key 5 is used for the smart verification through wireless communication with the vehicle 1, and has a key function of actuating the in-vehicle device 3 on the basis of the smart verification.

(Structural Elements of Vehicle)

Next, structural elements of the vehicle 1 will be described. The vehicle 1 includes the in-vehicle device 3, a verification electronic control unit (ECU) 8, a body ECU 9, an engine ECU 10, a low frequency (LF) transmitter 13, an ultra high frequency (UHF) receiver 14, and a communication device 31. As illustrated in FIG. 1, examples of the in-vehicle device 3 include a door lock device 6 and an engine 7 of the vehicle 1. The door lock device 6 controls whether to lock or unlock a vehicle door.

The verification ECU 8 includes memory 12, a key control section 42, a process execution section 43, and an authentication section 44. The authentication section 44 executes the smart verification, and authenticates the terminal 2 through the smart verification. The memory 12 of the verification ECU 8 stores a key ID specific to the terminal 2 and a key-specific key. The key ID and the key-specific key are used for the smart verification. Details of the key control section 42 and the process execution section 43 will be described later.

The body ECU 9 manages a power supply of in-vehicle electric equipment. For example, the body ECU 9 controls the door lock device 6 that switches between a locked state and an unlocked state of the vehicle door. In addition, the engine ECU 10 controls the engine 7. The verification ECU 8, the body ECU 9, and the engine ECU 10 are connected via communication lines 11 in the vehicle 1. For example, a protocol used for communication via the communication lines 11 may be a Controller Area Network (CAN) or a Local Interconnect Network (LIN).

The LF transmitter 13 transmits an LF radio wave to the terminal 2 to execute communication for the smart verification of the vehicle 1 and the terminal 2. In addition, when the terminal 2 receives the LF radio wave and transmits an UHF radio wave, the UHF receiver 14 receives the UHF radio wave transmitted from the terminal 2. Note that, for example, the LF transmitter 13 preferably includes an outdoor LF transmitter and an indoor LF transmitter. The outdoor LF transmitter transmits a radio wave to a terminal 2 that is located outside the vehicle 1. The indoor LF transmitter transmits a radio wave to a terminal 2 that is located inside the vehicle 1. Details of the communication device 31 will be described later.

(Structural Elements of Terminal)

Next, structural elements of the terminal 2 will be described. The terminal 2 includes a terminal control section 20, an LF reception section 21, an UHF transmission section 22, an ultra-wideband (UWB) transmission/reception section 33. The terminal control section 20 controls the terminal 2. The terminal control section 20 includes memory 23, a generation section 40a, and a key authentication section 41a. The memory 23 of the terminal control section 20 stores the key ID specific to the terminal 2 and the key-specific key. The key ID and the key-specific key are used for the smart verification. Details of the generation section 40a and the key authentication section 41a will be described later.

The LF reception section 21 receives the LF radio wave transmitted from the vehicle 1 to execute communication for the smart verification of the vehicle 1 and the terminal 2. When the LF reception section 21 receives the LF radio wave transmitted from the vehicle 1, the UHF transmission section 22 transmits an UHF radio wave to the vehicle 1. Details of the UWB transmission/reception section 33 will be described later.

(Smart Verification)

Next, a flow of the smart verification will be described. First, the LF transmitter 13 of the vehicle 1 transmits an wake signal periodically or randomly on a low frequency (LF). When the LF reception section 21 receives the wake signal, the terminal 2 shifts from a standby state to an activated state, and the UHF transmission section 22 transmits an ACK signal on an ultra high frequency (UHF). When the UHF receiver 14 receives the ACK signal transmitted from the terminal 2 in response to the wake signal, the authentication section 44 of the verification ECU 8 starts the smart verification. At this time, the authentication section 44 of the verification ECU 8 executes outdoor smart verification between an outdoor terminal 2 and the vehicle 1 in the case where the outdoor terminal 2 receives a wake signal from the outdoor LF transmitter 13. On the other hand, the authentication section 44 of the verification ECU 8 executes indoor smart verification between an indoor terminal 2 and the vehicle 1 in the case where the indoor terminal 2 receives a wake signal from the indoor LF transmitter 13.

Here, the smart verification may include key ID verification or may include request response authentication. The key ID verification is confirmation of whether a key ID registered on the terminal 2 is identical to a key ID pre-registered on the vehicle 1. The request response authentication uses the key-specific key. The request response authentication is authentication for confirming whether response codes are identical to each other by causing the vehicle 1 and the terminal 2 to compute the respective response codes using the key-specific key in response to request codes, which are random numbers. This example mainly focuses on a case where both the key ID verification and the request response authentication succeeds and thereby the authentication section 44 of the verification ECU 8 considers that the smart verification succeeds.

(Distance Measurement System)

As illustrated in FIG. 1, the communication system according to the present embodiment includes a distance measurement system 30. Hereinafter, the distance measurement system 30 will be described. Note that, the distance measurement system 30 directly measures a measurement value Vm corresponding to a distance between the vehicle 1 and the terminal 2. However, to simplify the description, sometimes this specification states that the distance measurement system 30 measures the distance between the vehicle 1 and the terminal 2.

Here, in the case where the terminal 2 is far away from the vehicle 1, communication connection is not established between the vehicle 1 and the terminal 2 and the smart verification does not succeed in a usual case. However, sometimes fraudulent behavior may be performed in such a manner that a relay or the like is used to establish the communication connection between the vehicle 1 and the terminal 2, which is far away from the vehicle 1, and to achieve success in the smart verification. To deal with such fraudulent behavior, the distance measurement system 30 has the function of measuring the measurement value Vm corresponding to the distance between the vehicle 1 and the terminal 2, and a function of deciding whether or not the smart verification has succeeded on the basis of validity of the measurement value Vm (fraudulent communication detection function).

The distance measurement system is mainly achieved by the UWB transmission/reception section 33 and the generation section 40a included in the terminal 2 and the communication device 31, the key control section 42, and the process execution section 43 included in the vehicle 1. The UWB transmission/reception section 33 executes communication with the communication device 31 to measure a distance. In addition, the communication device 31 executes communication with the terminal 2 to measure the distance. This example mainly focuses on a case where the vehicle 1 is provided with a plurality of the communication devices 31 (in particular, a master communication device 34 and a slave communication device 35). However, the number of communication devices 31 of the vehicle 1 is not limited.

In this example, the master communication device 34 is connected to the verification ECU 8 via a communication line 36. The slave communication device 35 is connected to the master communication device 34 via a communication line 37. For example, the LIN or CAN may be used as a communication protocol for the communication via the communication line 36 and the communication line 37. Note that, a communication interface such as a universal asynchronous receiver-transmitter (UART) may be used for the communication line 36.

The master communication device 34 includes a measurement section 32b, a communication control section 38, an interface section 39, a generation section 40b, and a key authentication section 41b. The interface section 39 is an interface capable of communicating with the verification ECU 8 and the slave communication device 35. For example, the interface section 39 outputs an actuation signal to the slave communication device 35. The communication control section 38 controls actuation of the slave communication device 35. In the case where the vehicle 1 includes a plurality of the slave communication devices 35 or in other cases, the communication control section 38 sets an order of actuation of the plurality of slave communication devices 35, or selectively actuates some of the slave communication devices 35, for example. Details of the measurement section 32b and the key authentication section 41b will be described later.

The slave communication device 35 includes a generation section 40c, a key authentication section 41c, and a measurement section 32c. Details of the generation section 40c, the key authentication section 41c, and the measurement section 32c will be described later.

Here, an example of installation of the communication devices 31 will be described with reference to FIG. 2. In the example illustrated in FIG. 2, the communication devices 31 are installed at five different positions on the vehicle 1. Among the communication devices 31, the master communication device 34 is installed inside the vehicle 1 to transmit a ranging radio wave in a vehicle interior. Details of the ranging radio wave will be described later. A first slave communication device 35a is installed in a corner of the vehicle 1 (in front of a driver's seat) to transmit the ranging radio wave toward the front of the vehicle 1 or toward the driver's seat. The second slave communication device 35b is installed in a corner of the vehicle 1 (in front of a front passenger seat) to transmit the ranging radio wave toward the front of the vehicle 1 or toward the front passenger seat.

A third slave communication device 35c is installed in a corner of the vehicle 1 (in back of the driver's seat) to transmit the ranging radio wave toward the back of the vehicle 1 and or toward the driver's seat. The fourth slave communication device 35d is installed in a corner of the vehicle 1 (in back of the front passenger seat) to transmit the ranging radio wave toward the back of the vehicle 1 or toward the front passenger seat. Note that, the arrangement of the communication devices 31 is not limited to the above-described example.

Referring again to FIG. 1, the terminal 2 and the communication device 31 use respective encryption keys. The encryption key (first encryption key) used by the terminal 2 and the encryption key (second encryption key) used by the communication device 31 are a common encryption key. In this example, authentication (hereinafter, also referred to as "encryption key authentication") is conducted to confirm that the common encryption key is used by the terminal 2 and the communication device 31. Next, even when a valid distance is obtained between the terminal 2 and the communication device 31, the smart verification is disabled if the encryption key authentication has failed. This makes it possible to prevent behavior of fraudulently achieving the smart verification.

Specifically, the terminal 2 and the slave communication device 35 use a common encryption key, and the terminal 2 and the master communication device 34 use a common encryption key. This example mainly focuses on a case where the encryption key commonly used by the terminal 2 and the master communication device 34 is identical to the encryption key commonly used by the terminal 2 and the slave communication device 35. However, it is also acceptable that the encryption key commonly used by the terminal 2 and the master communication device 34 may be different from the encryption key commonly used by the terminal 2 and the slave communication device 35.

In addition, in the case where the vehicle 1 includes a plurality of the slave communication devices 35, different encryption keys may be used for the respective slave communication devices 35. In other words, different encryption keys may be used for the respective communication devices 31. In other cases, it is also acceptable that among the plurality of slave communication devices 35, some of the slave communication devices 35 may use a same encryption key, and the other of the slave communication devices 35 may use different encryption keys.

(Change of Encryption Key)

Next, change of an encryption key will be described. As described above, if the common encryption key is cracked, this deteriorates security. Therefore, in this example, an encryption key is generated and an encryption key to be used for encryption is changed to the generated encryption key in the case where a condition of generating the encryption key (hereinafter, also referred to as "key generation condition") is satisfied. In this case, it is expected to improve security. Each of the terminal 2 and the communication device 31 holds key generation logic indicating a procedure of generating an encryption key. The key generation logic (first key generation logic) held by the terminal 2 is common to the key generation logic (second key generation logic) held by the communication device 31).

More specifically, the terminal 2 and the slave communication device 35 hold common key generation logic, and the terminal 2 and the master communication device 34 hold common key generation logic. This example mainly focuses on a case where the key generation logic commonly held by the terminal 2 and the master communication device 34 is identical to the key generation logic commonly held by the terminal 2 and the slave communication device 35. However, it is also acceptable that the key generation logic commonly held by the terminal 2 and the master communication device 34 may be different from the key generation logic commonly held by the terminal 2 and the slave communication device 35.

In addition, in the case where the vehicle 1 includes a plurality of the slave communication devices 35, different key generation logics may be held by the respective slave communication devices 35. In other words, different key generation logics may be held by the respective communication devices 31. In other cases, it is also acceptable that among the plurality of slave communication devices 35, some of the slave communication devices 35 may hold same key generation logic, and the other of the slave communication devices 35 may hold different key generation logics.

In addition, the terminal 1 and the communication device 31 hold respective key generation conditions. A key generation condition (first condition) held by the terminal 2 is common to a key generation condition (second condition) held by the communication device 31. More specifically, the terminal 2 and the slave communication device 35 hold a common key generation condition, and the terminal 2 and the master communication device 34 hold a common key generation condition. This example mainly focuses on a case where the key generation condition commonly held by the terminal 2 and the master communication device 34 is identical to the key generation condition commonly held by the terminal 2 and the slave communication device 35. However, it is also acceptable that the key generation condition commonly held by the terminal 2 and the master communication device 34 may be different from the key generation condition commonly held by the terminal 2 and the slave communication device 35.

In addition, in the case where the vehicle 1 includes a plurality of the slave communication devices 35, different key generation conditions may be held by the respective slave communication devices 35. In other words, different key generation conditions may be held by the respective communication devices 31. In other cases, it is also acceptable that among the plurality of slave communication devices 35, some of the slave communication devices 35 may hold a same key generation condition, and the other of the slave communication devices 35 may hold different key generation conditions.

The generation section 40*a* of the terminal 2 generates an encryption key on the basis of information for generating the encryption key (first information) and the key generation logic held by the terminal 2 in the case where the key generation condition held by the terminal 2 is satisfied. Next, the information for generating the encryption key is also referred to as a "seed". This example mainly focuses on a case where the seed is a random number. However, as will be described later, the seed is not limited to the random number.

In the case where the encryption key is generated for the first time, the generation section 40*a* of the terminal 2 uses the generated encryption key (first encryption key) for encryption. In addition, in the case where the encryption key is generated again, the generation section 40*a* of the terminal 2 functions as a change section (first change section) that changes the encryption key (first encryption key) to be used for encryption to the regenerated encryption key.

The generation section 40 of the communication device 31 generates an encryption key on the basis of the seed (first information) and the key generation logic held by the communication device 31 in the case where the key generation condition held by the communication device 31 is satisfied.

More specifically, the generation section 40*c* of the slave communication device 35 generates the encryption key on the basis of the seed and the key generation logic held by the slave communication device 35 in the case where the key generation condition held by the slave communication device 35 is satisfied. In addition, the generation section 40*b* of the master communication device 34 generates an encryption key on the basis of the seed and the key generation logic held by the master communication device 34 in the case where the key generation condition held by the communication device 34 is satisfied.

In the case where the encryption key is generated for the first time, the generation section 40 of the communication device 31 uses the generated encryption key (second encryption key) for encryption. In addition, in the case where the encryption key is generated again, the generation section 40 of the communication device 31 functions as a change section (second change section) that changes the encryption key (second encryption key) to be used for encryption to the regenerated encryption key.

More specifically, in the case where the encryption key is generated for the first time, the generation section 40*c* of the slave communication device 35 uses the generated encryption key for encryption. In addition, in the case where the encryption key is generated again, the generation section 40*c* of the slave communication device 35 changes the encryption key to be used for encryption to the generated encryption key. In addition, in the case where the encryption key is generated for the first time, the generation section 40*b* of the master communication device 34 uses the generated encryption key for encryption. On the other hand, in the case where the encryption key is generated again, the generation section 40*b* of the master communication device 34 changes the encryption key to be used for encryption to the generated encryption key.

As described above, the terminal 2 and the communication device 31 hold the common encryption key and the common key generation condition. In the case where the key generation condition held by the terminal 2 is satisfied, the generation section 40*a* of the terminal 2 changes the encryption key. In the case where the key generation condition held by the communication device 31 is satisfied, the generation section 40 of the communication device 31 changes the encryption key. Therefore, there is a high possibility that the respective encryption keys have already been changed by the terminal 2 and the communication device 31 even if the common encryption keys have been cracked by a third party and the third party tries to cheat on the basis of a result of the cracking. Therefore, it is expected to improve security.

In addition, as described above, the generation section 40*a* of the terminal 2 generates the encryption key in the case where the key generation condition held by the terminal 2 is satisfied. In addition, the generation section 40 of the communication device 31 generates the encryption key in the case where the key generation condition held by the communication device 31 is satisfied. Therefore, there is no need to preregister the encryption key that is common between the communication device 31 and the terminal 2 (in other words, even in the case where a communication device 31 is newly added, there is no need to preregister an encryption key that is common between the terminal 2 and the newly added communication device 31). Accordingly, it is possible to reduce the number of steps of pairing.

Here, the key generation condition held by the communication device 31 and the key generation condition held by the terminal 2 are not specifically limited.

This example mainly focuses on a case where the key generation condition held by the terminal 2 includes a condition that the seed (second information) has been input into the generation section 40a of the terminal 2, and the key generation logic held by the communication device 31 includes a condition that the seed (second information) has been input into the generation section 40 of the communication device 31. At this time, the generation section 40a of the terminal 2 changes the encryption key (first encryption key) to be used for encryption to an encryption key (third encryption key) generated on the basis of the seed (second information) and the key generation logic held by the terminal 2 in the case where the key generation condition held by the terminal 2 is satisfied. On the other hand, the generation section 40 of the communication device 31 changes the encryption key (second encryption key) to be used for encryption to an encryption key (fourth encryption key) generated on the basis of the seed (second information) and the key generation logic held by the communication device 31 in the case where the key generation condition held by the communication device 31 is satisfied.

Such a configuration makes it possible to change the respective encryption keys held by the terminal 2 and the communication device 31 in a similar way when a same seed is input into the generation section 40a of the terminal 2 and the generation section 40 of the communication device 31. Therefore, it is possible to reduce workload necessary to change the encryption key.

However, the key generation condition held by the terminal 2 and the key generation condition held by the communication device 31 are not limited to the above-described example. For example, each of the key generation condition held by the terminal 2 and the key generation condition held by the condition device 31 may include a condition that a predetermined time has elapsed. According to this configuration, the same encryption key is not used after a predetermined time has elapsed. Therefore, it is expected to improve security. The predetermined time may be time that comes only once or time that comes twice or more. In addition, the time that comes twice or more may be time that comes twice or more periodically.

Note that, in such a case, it is desirable that a timing at which the predetermined time has elapsed with regard to the terminal 2 is identical to a timing at which the predetermined time has elapsed with regard to the communication device 31. Therefore, it is desirable that the terminal 2 is synchronized with the communication device 31 is advance. Alternatively, a block (for example, the verification ECU 8 or the like) capable of communicating with both the terminal 2 and the communication device 31 may be used to determine whether the predetermined time has elapsed. In such a case, the block capable of communicating with both the terminal 2 and the communication device 31 may notify the terminal 2 and the communication device 31 that the predetermined time has elapsed.

Alternatively, the key generation condition held by the terminal 2 and the key generation condition held by the communication device 31 may include a condition that the number of communication (encrypted communication) performed between the terminal 2 and the communication device 31 by using the common encryption key reaches a predetermined number of times. According to this configuration, the same encryption key is not used after the number of encrypted communication reaches the predetermined number of times. Therefore, it is expected to improve security. Note that, for example, it is sufficient that each of the terminal 2 and the communication device 31 manages the number of encrypted communication performed between the terminal 2 and the communication device 31.

In a case where a predetermined condition is satisfied, the key control section 42 controls the generation section 40a to change the encryption key (change the first encryption key into the third encryption key) by outputting the seed (second information) to the generation section 40a of the terminal 2, and controls the generation section 40 to change the encryption key (change the second encryption key into the fourth encryption key) by outputting the seed (second information) to the generation section 40 of the communication device 31.

Such a configuration makes it possible to change the respective encryption keys held by the terminal 2 and the communication device 31 in a similar way when a same seed is output to the generation section 40a of the terminal 2 and the generation section 40 of the communication device 31 at a same timing.

The key control section 42 may prepare the seed in any way. In this example, it is assumed that the key control section 42 outputs a portion of authentication information to the communication device 31 as the seed, and outputs the portion of the authentication information to the terminal 2 as the seed. The authentication information is used by the authentication section 44 to authenticate the terminal 2. In such a case, it is possible to reduce time it takes to prepare the seed. Next, it is assumed that the authentication section 44 uses a request code generated through the smart verification as the authentication information. However, the authentication information is not limited to the request code generated through the smart verification.

More specifically, the request code generated through the smart verification is output from the verification ECU 8 to the terminal 2. Therefore, in the present example, it is assumed that the key control section 42 uses a portion of the request code output from the verification ECU 8 to the terminal 2 in the smart verification, as the seed to be output to the terminal 2. In other words, the key control section 42 outputs the whole request code including the seed to the terminal 2. In such a case, it is possible to reduce time it takes to prepare the seed, and reduce an amount of data to be output from the verification ECU 8 to the terminal 2.

Alternatively, the key control section 42 may output a portion of the request code to the terminal 2 as the seed in addition to the request code output from the verification ECU 8 to the terminal 2 in the smart verification. In other words, the key control section 42 may output the portion of the request code the whole request code in the smart verification to the terminal 2 in addition to the seed. In such a case, it is possible to reduce at least time it takes to prepare the seed.

Here, the condition for outputting the seed from the key control section 42 (in other words, the predetermined condition) may include a condition that the request code is generated by the authentication section 44. Such a configuration makes it possible to output the seed to the communication device 31 and the terminal 2 and regenerate the respective encryption keys to be used by the terminal 2 and the communication device 31 on the basis of the seed each time the authentication section 44 authenticates the terminal 2 (smart verification). Therefore, in the case where the communication between the terminal 2 and the communication device 31 ends, it is possible to delete the respective encryption keys from the communication device 31 and the terminal 2. Accordingly, it is possible to reduce respective memory usage amounts of the terminal 2 and the communication device 31.

Note that, the above description has assumed that the generation section 40a of the terminal 2 changes the encryption key (first encryption key) in the case where the key generation condition held by the terminal 2 is satisfied. In addition, the above description has assumed that the generation section 40 of the communication device 31 changes the encryption key (second encryption key) in the case where the key generation condition held by the communication device 31 is satisfied. However, it is also possible for the generation section 40a of the terminal 2 to change the encryption key by changing the key generation logic (first key generation logic) held by the terminal 2. In addition, it is also possible for the generation section 40 of the communication device 31 to change the encryption key by changing the key generation logic (second key generation logic) held by the communication device 31.

More specifically, the generation section 40a of the terminal 2 may change the key generation logic (first key generation logic) held by the terminal 2, may generate an encryption key on the basis of the seed (first information) and the changed key generation logic, and may change an encryption key (first encryption key) to the generated encryption key. The generation section 40 of the communication device 31 may change the key generation logic (second key generation logic) held by the communication device 31, may generate an encryption key on the basis of the seed (first information) and the changed key generation logic, and may change an encryption key (second encryption key) to the generated encryption key.

Here, the key generation logic held by the terminal 2 and the key generation logic held by the communication device 31 are changed in such a manner that they are common to each other. For example, the terminal 2 and the communication device 31 may hold a predefined procedure of changing common key generation logic (for example, procedure of changing common key generation logic or the like), and the communication device 31 and the terminal 2 may follow the procedure to change the key generation logic in a similar way. Alternatively, the key control section 42 may notify the terminal 2 and the communication device 31 which key generation logic should be changed. The key control section 42 may randomly decide which key generation logic to be changed, or it is possible to decide which key generation logic to be changed on the basis of some kind of rule.

(Encryption Key Authentication and Communication for Distance Measurement)

Next, encryption key authentication and communication for distance measurement will be described. For example, when the verification ECU 8 outputs a distance measurement request, the interface section 39 of the master communication device 34 accepts input of the distance measurement request from the verification ECU 8. Note that, this example assumes that the seed output from the verification ECU 8 is used as the distance measurement request. However, the distance measurement request is not limited to the seed output from the verification ECU 8. When the interface section 39 accepts the input of the distance measurement request, the communication control section 38 outputs the distance measurement request to the slave communication device 35 via the interface section 39.

When the communication devices 31 (master communication device 34 and the slave communication device 35) accepts the input of the distance measurement request, the communication devices 31 start communication with the terminal 2 for encryption key authentication and distance measurement. Note that, this example assumes that a common radio wave is used for the encryption key authentication and the communication for distance measurement. However, it is also possible to use different radio waves between the encryption key authentication and the communication for distance measurement. Therefore, it is not necessary to execute both the encryption key authentication and the communication for distance measurement. The communication for distance measurement may be executed only in the case where the encryption key authentication has succeeded. Alternatively, the encryption key authentication may be executed only in the case where a valid determination result of a measurement value is obtained through the communication for distance measurement.

First, the encryption key authentication will be described. This example assumes that request response authentication is conducted by using the common encryption keys held by the communication device 31 and the terminal 2, as an example of the encryption key authentication. However, a method of the encryption key authentication is not limited to the request response authentication.

The request response authentication is authentication for confirming whether response codes are identical to each other by causing the communication device 31 and the terminal 2 to compute the respective response codes using the encryption key in response to the request codes, which are random numbers. The response code is an example of encrypted information. This example assumes that the key authentication sections 41 of the communication devices 31 (that is, the key authentication section 41b of the master communication device 34 and the key authentication section 41c of the slave communication device 35) confirms whether the response codes of the respective communication devices 31 are identical to each other. However, it is also possible for the terminal 2 to confirm whether or not the response codes are identical to each other.

Next, the communication for distance measurement will be described. Note that, this example mainly assumes that UWB radio waves are used as radio waves (ranging radio wave and response radio wave) for the communication for distance measurement. Therefore, hereinafter, the radio wave used for the communication for distance measurement may also be referred to as "UWB radio wave Sa". However, the radio wave used for the communication for distance measurement is not limited to the UWB radio wave.

First, with regard to the communication for distance measurement, the communication devices 31 (that is, the master communication device 34 and the slave communication device 35) transmit the UWB radio waves Sa. When the UWB transmission/reception section 33 of the terminal 2 receives a UWB radio wave Sa from the communication device 31, the UWB transmission/reception section 33 returns an UWB radio wave Sa as a response. Next, the communication device 31 receives the UWB radio wave Sa transmitted from the terminal 2. At this time, the measurement section 32 of the communication device 31 (that is, the measurement section 32b of the master communication device 34 and the measurement section 32c of the slave communication device 35) measures a measurement value Vm corresponding to a distance between the communication device 31 and the terminal 2 (measurement value representing the distance)

More specifically, the measurement section 32 of the communication device 31 calculates propagation time from transmission of a UWB radio wave Sa to reception of a UWB radio wave Sa, which is a response to the transmitted UWB radio wave Sa, and the measurement section 32 of the communication device 31 computes the measurement value Vm corresponding to the distance between the communication device 21 and the terminal 2 (measurement value representing the distance) from the propagation time. In addition, the measurement section 32 determines whether or not the measurement value Vm is valid in the case where the encryption key authentication has succeeded. To determine whether or not the measurement value Vm is valid, it is determined whether or not the measurement value Vm is less than a prescribed value Vk, for example. On the other hand, the measurement section 32 does not determine whether or not the measurement value Vm is valid in the case where the encryption key authentication has failed.

In the case where it has been determined whether or not the measurement value Vm is valid, the communication device 31 outputs a determination result to the verification ECU 8. More specifically, the measurement section 32c of the slave communication device 35 outputs the determination result to the master communication device 34. When the determination result is input from the slave communication device 35, the measurement section 32b of the master communication device 34 outputs the input determination result to the verification ECU 8. In addition, in the case where it has been determined whether or not the measurement value Vm is valid, the measurement section 32b of the master communication device 34 outputs the determination result to the verification ECU 8.

The process execution section 43 of the verification ECU 8 decides whether or not the smart verification has succeeded on the basis of the determination result indicating whether or not the measurement value Vm is valid. For example, the process execution section 43 enables the successful smart verification in the case where at least one of the communication device s31 has input the determination result indicating that the measurement value Vm is valid. On the other hand, the process execution section 43 disables the successful smart verification in the case where no communication device s31 has input the determination result indicating that the measurement value Vm is valid. The verification ECU 8 permits actuation of the in-vehicle device 3 or actuates the in-vehicle device 3 in the case where the successful smart verification is enabled.

Note that, this example mainly assumes that the measurement section 32 does not determine whether or not the measurement value Vm is valid in the case where the encryption key authentication has failed. However, it is possible for the measurement section 32 to determine whether or not the measurement value Vm is valid even in the case where the encryption key authentication has failed. However, in the case where the encryption key authentication has failed, the communication device 31 does not have to output the determination result indicating whether or not the measurement value Vm is valid, to the verification ECU 8.

The above description has assumed that the terminal 2 transmits the response code to the communication device 31 and the communication device 31 executes the predetermined process on the basis of the encryption key (second encryption key) common to the encryption key (first encryption key) and the response code received from the terminal 2, the response code being obtained by encrypting the request code using the encryption key (first encryption key). In particular, the above description has assumed that, as the predetermined process, the communication device 31 performs a process (encryption key authentication) of checking the response code encrypted by using the encryption key (first encryption key) against the response code encrypted by using the encryption key (second encryption key).

However, the predetermined process performed by the communication device 31 is not limited to the above-described example. For example, the terminal 2 may transmit encrypted information to the communication device 31. The encrypted information is obtained by encrypting information using the encryption key (first encryption key). When the communication device 31 receives the encrypted information, which has been encrypted using the encryption key (first encryption key), from the terminal 2, the communication device 31 may perform a process of decrypting the encrypted information that has been received from the terminal 2 by using the encryption key (second encryption key), as the predetermined process.

Note that, instead of the communication device 31, it is also possible for the terminal 2 to perform the predetermined process. At this time, the communication device 31 may transmit encrypted information to the terminal 2. The encrypted information is obtained by encrypting information using the encryption key (second encryption key). When the terminal 2 receives the encrypted information, which has been encrypted using the encryption key (second encryption key), from the communication device 31, the terminal 2 may perform a process of decrypting the encrypted information that has been received from the communication device 31 by using the encryption key (first encryption key), as the predetermined process.

1.2. Operation Example

Next, with reference to FIG. 3, action of the communication system according to the present embodiment will be described. Hereinafter, to improve visualization of wording, sometimes the seed will be referred to as a seed Ds, the key generation logic will be referred to as key generation logic f, and the encryption key will be referred to as an encryption key Dk.

Figure 3:
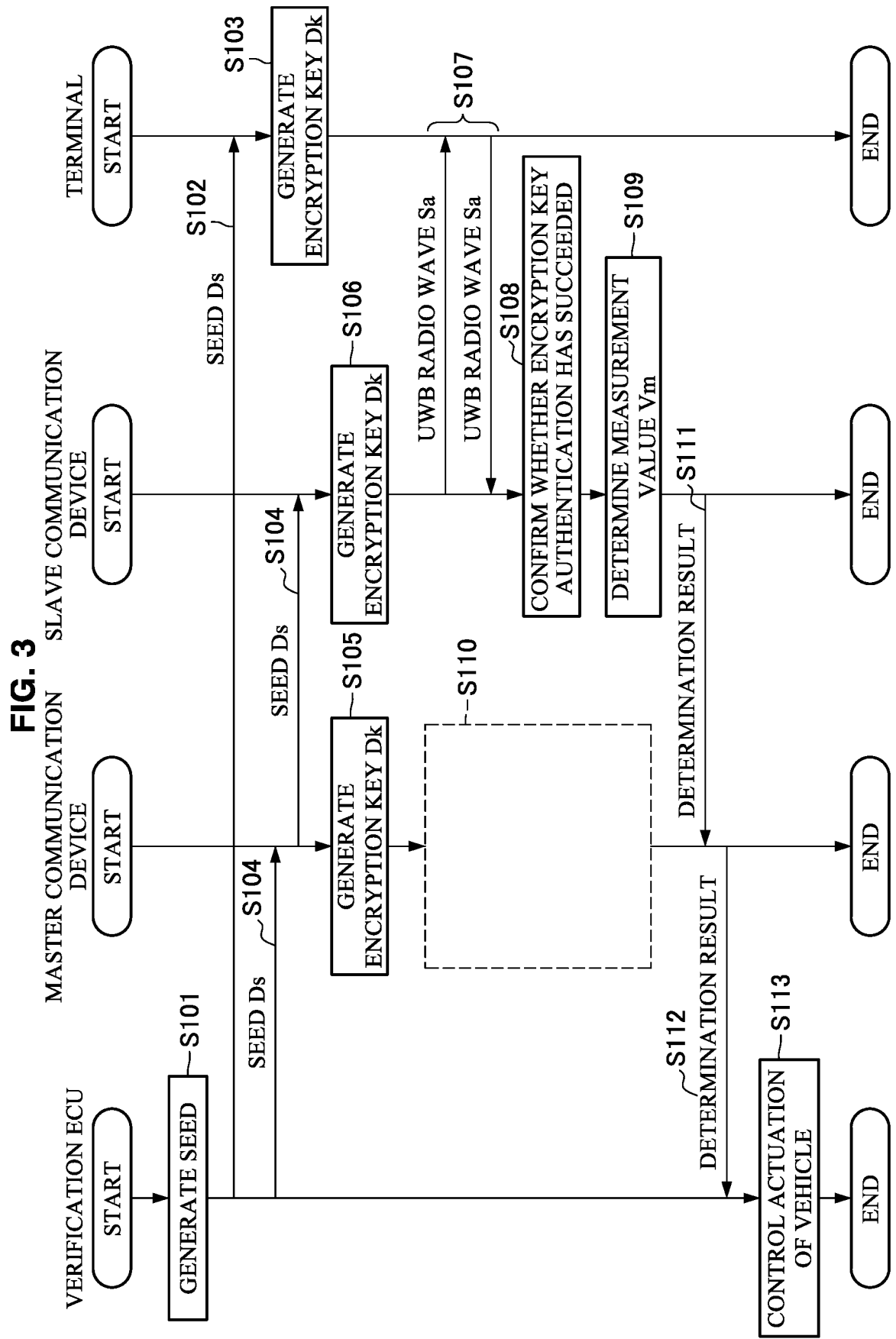
FIG. 3 is a flowchart illustrating a procedure of distance measurement.

As illustrated in FIG. 3, the key control section 42 generates the seed D2 in Step S101. As described above, the seed Ds may be a random number, for example. This example assumes that a portion of a request code is used as the seed Ds. The request code is to be transmitted to the terminal 2 during the request response authentication in the smart verification. As described above, the seed Ds is included in the request code generated during the request response authentication in the smart verification in the electronic key system 4. Accordingly, it becomes not necessary to generate the seed Ds in addition to the request code in the distance measurement system 30. Therefore, it is possible to eliminate time it takes to prepare the seed and time it takes to transmit the seed.

In Step S102, the key control section 42 transmits the seed Ds to the terminal 2. When the seed Ds is received, the generation section 40a of the terminal 2 generates the encryption key Dk by passing the seed Ds through the key generation logic fin Step S103.

In Step S104, the key control section 42 outputs a seed Ds to the master communication device 34. This seed Ds is the same as the seed Ds transmitted to the terminal 2. When the seed Ds is input, the interface section 39 of the master communication device 34 outputs the input seed Ds to the slave communication device 35. In this example, the input of the seed Ds into the communication device 31 also function as a trigger to start the communication for distance measurement. Therefore, when the seed Ds is input, the master communication device 34 shifts from a sleep state to an activated state, and starts the communication for distance measurement. In a similar way, when the seed Ds is input, the slave communication device 35 shifts from the sleep state to the activated state, and starts the communication for distance measurement.

When the seed Ds is input, the generation section 40b of the master communication device 34 generates the encryption key Dk by passing the seed Ds through the key generation logic fin Step S105. In a similar way, when the seed Ds is input, the generation section 40c of the slave communication device 35 generates the encryption key Dk by passing the seed Ds through the key generation logic f in Step S106. This allows the terminal 2 and the communication device 31 to acquire the common encryption keys Dk. Through the processes in Step S102 to Step S106, the generation section 40 changes the encryption key Dk each time the seed Dk is received. In the case where the seed Dk is output each time the smart verification is executed, the encryption key Dk is changed each time the smart verification is executed.

In Step S107, the key authentication section 41c of the slave communication device 35 generates the request code of the encryption key authentication, and transmits a UWB radio wave Sa including the request code to the terminal 2. At this time, the communication control section 38 of the master communication device 34 sets an order of actuation of the slave communication devices 35, and causes the slave communication device 35 to transmit the UWB radio wave Sa while following the order of actuation. When the UWB radio wave Sa is received, the terminal 2 computes a response code, which is a response to the request code included in the UWB radio wave Sa. In addition, the key authentication section 41a of the terminal 2 may determine whether or not the encryption key authentication has succeeded on the basis of whether or not the response code included in the UWB radio wave Sa serving as the response is identical to the response code computed by the terminal 2. More specifically, the key authentication section 41a of the terminal 2 determines that the encryption key authentication has succeeded in the case where the response codes are identical to each other. On the other hand, the key authentication section 41a of the terminal 2 determines that the encryption key authentication has failed in the case where the response codes are not identical to each other. In the case where the encryption key authentication has failed, the key authentication section 41a of the terminal 2 ends the process. Note that, the terminal 2 includes the computed response code into the UWB radio wave Sa serving as the response and then transmits the UWB radio wave Sa. The terminal 2 may transmit the UWB radio wave Sa including the response code in the case where the encryption key authentication has succeeded.

The measurement section 32c of the slave communication device 35 measures time from transmission of the UWB radio wave Sa to reception of the UWB radio wave Sa serving as the response. Next, the slave communication device 35 calculates the measurement value Vm corresponding to the distance between the slave communication device 35 and the terminal 2, from the measured time.

On the other hand, the key authentication section 41c of the slave communication device 35 determines whether or not the encryption key authentication has succeeded on the basis of whether or not the response code included in the UWB radio wave Sa serving as the response is identical to the response code computed by the slave communication device 35. More specifically, the key authentication section 41c determines that the encryption key authentication has succeeded in the case where the response codes are identical to each other. On the other hand, the key authentication section 41c determines that the encryption key authentication has failed in the case where the response codes are not identical to each other. In the case where the encryption key authentication has failed, the key authentication section 41c ends the process.

In the case where the encryption key authentication has succeeded, the slave communication device 35 determines validity of the measurement value Vm measured by the slave communication device 35 in Step S109. The slave communication device 35 determines validity of a positional relation between the terminal 2 and the vehicle 1 by comparing the measurement value Vm with the prescribed value Vk. In other words, the slave communication device 35 determines whether or not the distance between the terminal 2 and the vehicle 1 is a prescribed distance or less. The slave communication device 35 determines that the distance between the vehicle 1 and the terminal 2 is valid in the case where the measurement value Vm is less than the prescribed value Vk. On the other hand, the slave communication device 35 determines that the distance between the vehicle 1 and the terminal 2 is not valid in the case where the measurement value Vm is the prescribed value Vk or more.

In Step S110, the master communication device 34 executes a series of processes of transmission/reception of the UWB radio waves Sa, the encryption key authentication, and the determination of the measurement value Vm. In particular, the master communication device 34 transmits the radio wave Sa when a timing of actuating the master communication device 34 comes. This makes it possible to transmit/receive the UWB radio waves Sa between the terminal 2 and the plurality of communication devices 31. However, the master communication device 34 transmits/receives the UWV radio waves Sa, executes the encryption key authentication, and determines the measurement value Vm while following orders similar to Step S107 to Step S109. Therefore, details thereof will be omitted. Note that, FIG. 3 illustrates only a single round trip of the UWB radio wave Sa transmitted/received between the terminal 2 and the slave communication device 35, as a representative of the UWB radio waves Sa transmitted/received between the terminal 2 and the plurality of communication devices 31.

In the case where the encryption key authentication has succeeded, the slave communication device 35 notifies the master communication device 34 of a result of determining the measurement value Vm in Step S111. In Step S112, the interface section 39 of the master communication device 34 notifies the verification ECU 8 of the result of determining the measurement value Vm input from the slave communication device 35. In addition, the master communication device 34 notifies the verification ECU 8 of the result of determining the measurement value Vm by the master communication device 34 itself.

In Step S113, the verification ECU 8 controls actuation of the vehicle 1 on the basis of the result of determining the measurement value Vm. More specifically, the process execution section 43 determines whether or not the smart verification has succeeded on the basis of the result of determining the measurement value Vm. For example, the process execution section 43 validates a verification result obtained through the smart verification in the case where any of the communication devices 31 determine that the measurement value Vm is valid. On the other hand, the process execution section 43 invalidates a verification result obtained through the smart verification in the case where all the communication devices 31 determine that the measurement value Vm is not valid.

For example, the verification ECU 8 permits or causes the body ECU 9 to execute locking/unlocking actuation of the door lock device 6 in the case where the outdoor smart verification of an outdoor terminal 2 has succeeded and the process execution section 43 validates the verification result of the smart verification. Therefore, for example, a vehicle door is unlocked when an exterior door handle is touched in a state where the door is locked. In addition, the vehicle door is locked when a lock button of the exterior door handle is pushed in a state where the door is unlocked.

On the other hand, the verification ECU 8 permits transition operation of a vehicle power supply via an indoor ignition switch 50 in the case where the indoor smart verification of the indoor terminal 2 has succeeded and the process execution section 43 has validated a verification result. Therefore, for example, the engine 7 starts when the ignition switch 50 is operated while a brake pedal is depressed.

The verification ECU 8 prohibits actuation of the in-vehicle device 3 in the case where the process execution section 43 invalidates the verification result of the smart verification. For example, this makes it possible to prevent actuation of the in-vehicle device 3 through fraudulent communication using a relay or the like. In addition, the encryption key authentication is conducted between the terminal 2 and the communication device 31. Therefore, it is possible to ensure security of the communication for distance measurement between the terminal 2 and the communication device 31.

1.3. Effect

According to the above-described embodiment, there is provided the communication system including: a first device configured to transmit encrypted information that is encrypted by using the first encryption key; and a second device configured to execute the predetermined process based on the encrypted information obtained from the first device, and a second encryption key that is common to the first encryption key. The first device includes the first change section configured to change the first encryption key in the case where the first condition is satisfied. The second device includes the second change section configured to change the second encryption key in the case where the second condition is satisfied, the second condition being common to the first condition.

According to such a configuration, there is a high possibility that the respective encryption keys have already been changed by the first device and the second device even if the common encryption keys have been cracked by a third party and the third party tries to cheat on the basis of a result of the cracking. Therefore, it is expected to improve security.

In addition, the first encryption key is generated on the basis of first key generation logic that is logic indicating a procedure of generating the first encryption key and the first information, and the second encryption key is generated on the basis of the first information and second key generation logic that is common logic to the first key generation logic.

According to such a configuration, there is no need to preregister the encryption keys that are common between the first device and the second device. Accordingly, it is possible to reduce the number of steps of pairing.

In addition, the first condition may include a condition that the second information is input into the first change section. The second condition may include a condition that the second information is input into the second change section. In the case where the first condition is satisfied, the first change section may change the first encryption key into the third encryption key that is generated on the basis of the first key generation logic and the second information. In the case where the second condition is satisfied, the second change section may change the second encryption key into the fourth encryption key that is generated on the basis of the second key generation logic and the second information.

Such a configuration makes it possible to change the respective encryption keys held by the first device and the second device in a similar way when same information is input into the first change section and the second change section. Therefore, it is possible to reduce workload necessary to change the encryption key.

One of the first device and the second device may be the terminal, and the other of the first device and the second device may be the communication device that performs wireless communication with the terminal. In addition, the communication system may include the authentication section configured to authenticate the terminal. The key control section may output a portion of authentication information to the first device as the second information, and may output the portion of the authentication information to the second device as the second information. The authentication information is used for the authentication. In such a case, it is possible to reduce time it takes to prepare the second information.

For example, the key control section may output the whole authentication information to the terminal. The whole authentication information includes the portion of authentication information. In such a case, it is possible to reduce time it takes to prepare the second information, and reduce an amount of data to be output from the key control section to the terminal. Alternatively, the key control section may output the whole authentication information to the terminal in addition to the portion of the authentication information. In such a case, it is possible to reduce at least time it takes to prepare the second information.

The predetermined condition may include a condition that the authentication information is generated. Such a configuration makes it possible to output the information to the communication device and the terminal and regenerate the respective encryption keys to be used by the terminal and the communication device on the basis of the information each time the terminal is authenticated. Therefore, in the case where the communication between the terminal and the communication device ends, it is possible to delete the respective encryption keys from the communication device and the terminal. Accordingly, it is possible to reduce respective memory usage amounts of the terminal and the communication device.

In addition, there is provided a control device capable of communicating with the first device and the second device.

When the first device transmits encrypted information that is encrypted by using the first encryption key to the second device, the second device executes the predetermined process based on the encrypted information and the second encryption key that is common to the first encryption key. In addition, the control device includes a key control section configured to control change of the first encryption key and the second encryption key in the case where the predetermined condition is satisfied.

According to such a configuration, there is a high possibility that the respective encryption keys have already been changed by the first device and the second device even if the common encryption keys have been cracked by a third party and the third party tries to cheat on the basis of a result of the cracking. Therefore, it is expected to improve security.

1.4. Modifications

Although details of the preferable embodiment of the present invention has been described above with reference to the appended drawings, the present invention is not limited thereto. It will be clear to a person of ordinary skill in the art of the present invention that various modifications and improvements may be obtained within the scope of the technical idea recited by the scope of the appended claims, and it should be understood that they will naturally come under the technical scope of the present invention.

For example, it is possible to modify the above embodiment as described below. The above-described embodiment and modifications listed below may be combined with each other to perform the present invention unless they are technologically contradictory to each other.

(Modification of Structural Elements Related to Encryption Key Authentication)

Figure 4:
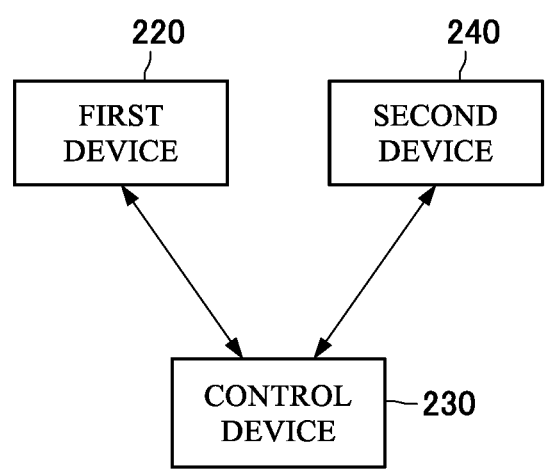
FIG. 4 is a diagram for describing a modification of structural elements related to encryption key authentication in a communication system according to the present embodiment.

FIG. 4 is a diagram for describing a modification of the structural elements related to the encryption key authentication in the communication system according to the present embodiment.

The above description has assumed that the verification ECU 8 (more specifically, the key control section 42 of the verification ECU 8) controls the first encryption key held by the terminal 2 and the second encryption key held by the communication device 31. In such a case, as described above, a portion of data used for the wireless communication between the verification ECU 8 and the terminal 2 can be used as the seed. However, the device of controlling the encryption keys is not limited to the verification ECU 8. In addition, the devices that hold the encryption keys are not limited to the terminal 2 and the communication device 31.

For example, as illustrated in FIG. 4, the device that controls the encryption keys may be a control device 230, and the devices that hold the encryption keys may be a first device 220 and a second device 240, which are capable of communicating with the control device 230. At this time, in a similar way to the terminal 2, the first device 220 transmits encrypted information that is encrypted by using the first encryption key to the second device 240. In addition, in a way similar to the communication device 31, the second device 240 executes the predetermined process based on the encrypted information obtained from the first device and the second encryption key that is common to the first encryption key. Next, the control device 230 includes the key control section configured to control change of the first encryption key and the second encryption key in the case where a predetermined condition is satisfied.

Unlike the verification ECU 8, the control device 230 does not have to control transmission of the LF radio waves and reception of the UHF radio waves. For example, the control device 230 may control communication using another wireless communication (such as Near-Field Communication (NFC)) or communication using Bluetooth Low Energy (BLE) (registered trademark). In addition, the control device 230 may be a server capable of communicating with the first device 220 and the second device 240. In other words, the key control section 42 may be installed in the server capable of communicating with the vehicle 1 and the terminal 2. Alternatively, the control device 230 may be an in-vehicle ECU other than the verification ECU 8. In other words, the key control section 42 may be installed in the in-vehicle ECU other than the verification ECU 8. For example, the in-vehicle ECU may be the body ECU 9 or the engine ECU 10.

In addition, unlike the communication between the terminal 2 and the communication device 31, the communication between the first device 220 and the second device 240 does not have to be performed by using the UWB radio wave. For example, the communication between the first device 220 and the second device 240 may be performed by using another wireless communication (for example, communication using the NFC, communication using the BLE, or the like). In addition, the above description has assumed that the electronic key 5 is used as the terminal 2 that is an example of the first device 220. However, an intelligent cell phone or the like may be used as the terminal 2 that is an example of the first device 220.

In the above described example, the terminal 2 corresponds to an example of the first device 220, and the communication device 31 corresponds to an example of the second device 240. However, it is also possible that the communication device 31 corresponds to an example of the first device 220 and the terminal 2 corresponds to an example of the second device 240. In other words, one of the first device 220 and the second device 240 may be the terminal 2, and the other of the first device 220 and the second device 240 may be the communication device 31 that performs wireless communication with the terminal 2.

Other modifications will be described below.

(Modification Related to Seed)

The above example has mainly focused on the case where the seed Ds is generated during the smart verification. Specifically, the above example has mainly focused on the case where the seed Ds is generated with generation of the request code during the request response authentication in the smart verification. However, a timing of generating the seed Ds is not limited. For example, the seed Ds may be generated at the time of transmitting the wake signal, or may be generated at the time of confirming the key ID. Alternatively, the seed Ds may be generated before the smart verification, or may be generated after the smart verification. In other words, the seed Ds is not limited to the portion of the authentication information transmitted to the terminal 2 at the time of authenticating the terminal 2.

The above example has mainly focused on the case where the seed Ds is a random number. However, the seed Ds may be data that changes periodically. In other words, it is sufficient for the seed Ds to be information that may change over time. The seed Ds is preferably information that changes each time the information is output.

It is also possible to output the seed Ds only once to register the common encryption key Dk on the terminal 2 and the communication device 31. In other words, it is not necessary to output the seed Ds each time the terminal 2 and the communication device 31 communicate with each other, or it is not necessary to output the seed Ds each time a process of starting encrypted communication between the terminal 2 and the communication device 31 is executed.

The seed Ds may be generated by the verification ECU 8, the terminal 2, or the communication device 31.

(Modification Related to Encryption Key)

The above example has mainly focused on the case where the respective encryption key Dk held by the communication device 31 (master communication device 34 or slave communication device 35) and the terminal 2 are changed each time the smart verification is conducted. However, it is also possible to generate the respective encryption key Dk held by the communication device 31 (master communication device 34 or slave communication device 35) and the terminal 2 each time a distance is measured or each time the UWB radio wave Sa is transmitted. In other words, the designated condition for changing the encryption key Dk is not specifically limited.

The above example has mainly focused on the case where the encryption keys Dk are generated by the respective communication devices 31 (master communication device 34 and slave communication device 35). However, if an encryption key Dk is generated by at least one of the communication devices 31, the rest of the communication devices 31 may be notified of the generated encryption key Dk. For example, the slave communication device 35 is notified of the encryption key Dk generated by the master communication device 34. Alternatively, the encryption key Dk may be generated by the verification ECU 8. In other words, the verification ECU 8 may include the generation section 40 that generates the encryption key Dk. At this time, the encryption key Dk generated by the verification ECU 8 may be output to the master communication device 34.

the above example has mainly focused on the case where the communication for measuring a distance between the terminal 2 and the communication device 31 is the encryption communication performed through the encryption key authentication using the common encryption key Dk between the terminal 2 and the communication device 31. In addition, the above example has mainly focused on the case where the encryption key authentication is the request response authentication. However, the method of encryption key authentication is not limited to the request response authentication. In other words, various authentication methods is applicable to the method of encryption key authentication.

More specifically, the above example has mainly focused on the case where the terminal 2 and the communication device 31 use the common encryption key, one of the terminal 2 and the communication device 31 transmits a response code of the request response authentication as an example of the encrypted information, and a response code received by the other of the terminal 2 and the communication device 31 is checked against the response code generated by the one of the terminal 2 and the communication device 31 as an example of the encrypted information. However, the method of encryption key authentication is not limited to the request response authentication. Therefore, the encrypted information is not limited to the response code of the request response authentication.

(Modification Related to Communication for Distance Measurement)

The above example has mainly focused on the case where the trigger to start the communication for distance measurement is a trigger related to the smart verification. (in the above example, the trigger is output of the seed Ds generated on the basis of the response code during the request response authentication in the smart verification.) However, the trigger to start the communication for distance measurement is not limited thereto. For example, the trigger to start the communication for distance measurement may be operation performed on a door handle of a vehicle door, or may be operation performed on the ignition switch 50. In addition, regardless of the type of the trigger to start the communication for distance measurement, a timing of the communication for distance measurement may be a timing before the smart verification, may be a timing after the smart verification, or may be a timing during the smart verification. For example, in the case where the communication for distance measurement is executed before or during the smart verification, sometimes the process execution section 43 disables the successful smart verification. In such a case, the process execution section 43 may force the smart verification to quit before the smart verification finishes. In other words, it is sufficient for the process execution section 43 to perform some kind of process of preventing the smart verification (smart communication) from succeeding in the case where the successful smart verification is disabled.

The above example has mainly focused on the case where the communication for distance measurement is performed in the case where the smart verification is conducted regardless of the type of the smart verification. However, even in the case where the smart verification is performed, it is also possible to control whether or not to perform communication for distance measurement, depending on the type of the smart verification. For example, in the case where the outdoor smart verification is conducted, the communication for distance measurement is not performed. However, the communication for distance measurement may be performed only in the case where the indoor smart verification is conducted. In other words, the communication control section 38 does not actuate the communication device 31 in an LF radio wave area formed outside the vehicle 1, but may actuate the communication device 31 in an LF radio wave area formed inside the vehicle 1.

The above example has mainly focused on the case where the measurement section 32 of the slave communication device 35 measures the measurement value Vm. At this time, the slave communication device 35 transmits a ranging radio wave to the terminal 2. However, it is also possible for a structural element other than the slave communication device 35 to measure the measurement value Vm. For example, the terminal 2 may measure the measurement value Vm. At this time, it is sufficient to transmit the ranging radio wave from the terminal 2 to the slave communication device 35.

The above example has mainly focused on the case where the measurement value Vm is measured on the basis of propagation time of the radio wave between the slave communication device 35 and the terminal 2. However, the method of measuring the measurement value Vm is not limited thereto. For example, in the case where one of the slave communication device 35 and the terminal 2 receives a radio wave transmitted from the other of the slave communication device 35 and the terminal 2, the one of the slave communication device 35 and the terminal 2 may measure strength of the received radio wave (received signal strength indicator (RSSI)), and may calculate a measurement value corresponding to the distance on the basis of the strength of the received radio wave.

In addition, the radio wave may be transmitted by using a plurality of channels. At this time, the measurement section 32 may calculate the measurement value Vm on the basis of respective results of transmitting the radio wave by using the plurality of channels (propagation time or strength of received radio wave). The method of communication for distance measurement (ranging radio wave and response radio wave) is not limited to the method of using the UWB radio wave Sa. For example, a radio wave of another frequency may be used for the communication for distance measurement. As an example, Bluetooth (registered trademark) communication may be used for the communication for distance measurement.

(Various Modifications of System)

The above example has mainly focused on the case where the verification ECU 8 includes the process execution section 43 that decides whether or not the smart verification has succeeded. However, the installation position of the process execution section 43 is not limited thereto. For example, the process execution section 43 may be included in the master communication device 34, may be included in the slave communication device 35, or may be included in the terminal 2.

The above example has mainly focused on the case where the measurement section 32 of the slave communication device 35 determines validity of the measurement value Vm corresponding to the distance between the slave communication device 35 and the terminal 2. In other words, the above example has mainly focused on the case where the master communication device 34 notifies the verification ECU 8 of a result of determination made by the slave communication device 35. However, it is also possible for the master communication device 34 to determine the validity of the measurement value Vm. At this time, it is sufficient for the master communication device 34 to notify the verification ECU 8 whether the smart verification has succeeded, on the basis of a result of determination made by the slave communication device 35. Alternatively, it is also possible for the verification ECU 8 to determine the validity of the measurement value Vm. At this time, it is sufficient for the master communication device 34 to notify the verification ECU 8 of the measurement value Vm measured by the slave communication device 35. Alternatively, it is also possible for the terminal 2 to determine the validity of the measurement value Vm.

Figure 2:
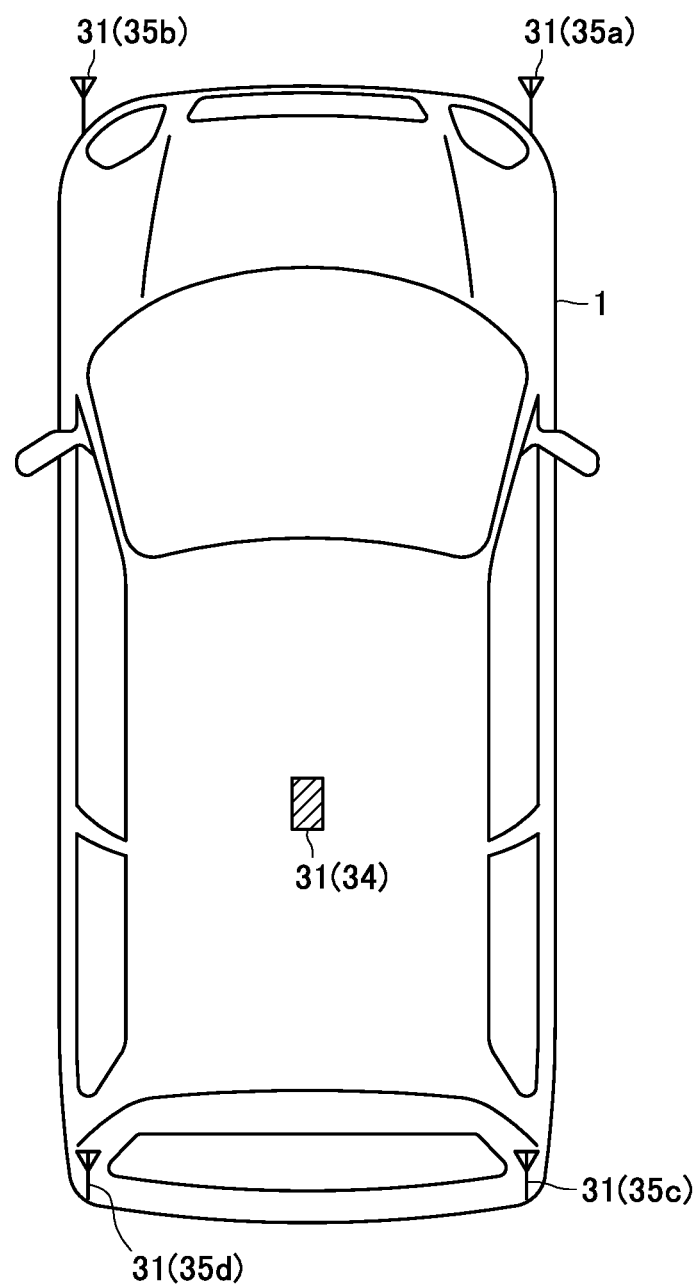
FIG. 2 is a diagram illustrating arrangement of communication devices in a vehicle.

The above example has mainly focused on the case where the number of communication devices 31 is six (in the example illustrated in FIG. 2, the vehicle 1 includes the one master communication device 34 and the four slave communication devices 35). However, the number of communication devices 31 is not limited. For example, the number of communication devices 31 may be one, two, three, or more.

The LF transmitter 13 may be installed in the vehicle 1 in such a manner that the LF transmitter 13 of the vehicle 1 forms an LF radio wave (wake signal) area around the vehicle 1. For example, the LF transmitter 13 of the vehicle 1 may form the LF radio wave area around a driver side door, around a front passenger door, around rear doors, and inside a vehicle cabin. The communication control section 38 may control actuation of the communication device 31 on the basis of the LF radio wave area formed by the LF transmitter 13. For example, in the case where the terminal 2 has entered the LF radio wave area around the driver side door and the outdoor smart verification has succeeded, the communication control section 38 actuates only the first slave communication device 35a and the third slave communication device 35c, which are close to the driver's seat, but does not actuate the other slave communication devices 35.

As described above, it is assumed that the plurality of slave communication devices 35 are installed in the vehicle 1. In such a case, respective results of determination made by the plurality of slave communication devices 35 are output to the master communication device 34. Each of the results indicates validity of a measurement value Vm corresponding to a distance between each slave communication device 35 and the terminal 2. At this time, the master communication device 34 may notify the verification ECU 8 of the determination results separately at respective timings of inputting the determination results, or may output the entire determination results to the verification ECU 8 collectively at a time when input of the entire determination results finishes.

The above example has mainly focused on the case where the process execution section 43 decides whether or not the smart verification has succeeded. However, the process executed by the process execution section 43 is not limited to the process of deciding whether or not the smart verification has succeeded. For example, the process execution section 43 may control actuation of the in-vehicle device 3 depending on the measurement value Vm, in addition to the process of deciding whether or not the smart verification has succeeded.

The above example has mainly focused on the case where the wake signal is transmitted from the vehicle 1 to the terminal 2 in the smart verification system. However, the wake signal may be transmitted from the terminal 2 to the vehicle 1.

The above example has mainly focused on the case where the electronic key system 4 is the smart verification system that executes the smart verification. However, the electronic key system 4 is not limited to the smart verification system. For example, the electronic key system 4 may be any system as long as the system is capable of confirming whether the terminal 2 is right or wrong. Alternatively, it is also possible to omit the electronic key system 4, and confirm whether or not the terminal 2 is right or wrong through the UWB communication. The above example has mainly focused on the case of confirming whether or not the terminal 2 is right or wrong through verification of key IDs or through the request response authentication. However, the method of confirming whether or not the terminal 2 is right or wrong is not limited thereto. For example, the method of confirming whether or not the terminal 2 is right or wrong may be any method as long as it is possible for the terminal 2 and the vehicle 1 to confirm whether or not the terminal 2 and the vehicle 1 forms a valid pair through communication.

The above example has mainly focused on the case where the terminal 2 is the electronic key 5. However, the terminal 2 is not limited to the electronic key 5. For example, the terminal 2 may be an intelligent cell phone capable of wirelessly communicating with the vehicle 1. The above example has mainly focused on the case where the distance measurement system 30 has the function of measuring the measurement value Vm corresponding to the distance between the vehicle 1 and the terminal 2, and the function of deciding whether or not the smart verification has succeeded on the basis of validity of the measurement value Vm (fraudulent communication detection function). However, it is sufficient for the distance measurement system 30 to have the function of measuring the measurement value Vm, and it is not necessary for the distance measurement system 30 to have the fraudulent communication detection function.

The above example has mainly focused on the case where the encryption key that is common between the terminal 2 and the communication device 31 is used for encryption of the communication for distance measurement. However, the encryption key that is common between the terminal 2 and the communication device 31 may also be used for encryption of communication or the like other than the communication for distance measurement.

The frequencies of the radio waves and the communication methods used for various kinds of communication between the vehicle 1 and the terminal 2 may be changed into various embodiments. The above example has mainly focused on the case where a communication partner of the terminal 2 is the vehicle 1. However, the communication partner of the terminal 2 is not limited to the vehicle 1. It is possible to change the communication partner to various devices.

REFERENCE SIGNS LIST

1 vehicle
2 terminal
3 in-vehicle device
4 electronic key system
5 electronic key
8 verification ECU
20 terminal control section
30 distance measurement system
31 communication device
32 measurement section
34 master communication device
35 slave communication device
38 communication control section
39 interface section
40 generation section
41 key authentication section
42 key control section
43 process execution section
44 authentication section
50 ignition switch
230 control device
220 first device
240 second device

The invention claimed is:

1. A communication system, comprising:
a first device configured to transmit encrypted information that is encrypted by using a first encryption key;
a second device configured to execute a predetermined process based on the encrypted information obtained from the first device, and a second encryption key that is common to the first encryption key;
an authentication section; and
a key control section,
wherein the first device includes a first change section configured to change the first encryption key in a case where a first condition is satisfied, and
the second device includes a second change section configured to change the second encryption key in a case where a second condition is satisfied, the second condition being common to the first condition,
the first encryption key is generated on a basis of first key generation logic that is logic indicating a procedure of generating the first encryption key and first information,
the second encryption key is generated on a basis of the first information and second key generation logic that is common logic to the first key generation logic,
the first condition includes a condition that second information is input into the first change section,
the second condition includes a condition that the second information is input into the second change section,
in a case where the first condition is satisfied, the first change section changes the first encryption key into a third encryption key that is generated on a basis of the first key generation logic and the second information,
in a case where the second condition is satisfied, the second change section changes the second encryption key into a fourth encryption key that is generated on a basis of the second key generation logic and the second information,
a first one of the first device and the second device is a terminal,
a second one of the first device and the second device is a communication device that performs wireless communication with the terminal,
the authentication section generates authentication information used to authenticate the terminal, and
the key control section outputs a portion of authentication information to the first device as the second information, and outputs the portion of the authentication information to the second device as the second information.

2. The communication system according to claim 1,
wherein, in a case where a predetermined condition is satisfied, the key control section controls the first change section to change the first encryption key into the third encryption key by outputting the second information to the first change section, and controls the second change section to change the second encryption key into the fourth encryption key by outputting the second information to the second change section.

3. The communication system according to claim 1,
wherein the authentication section is configured to authenticate the terminal.

4. The communication system according to claim 1,
wherein the key control section outputs the whole authentication information to the terminal, the whole authentication information including the portion of the authentication information.

5. The communication system according to claim 1,
wherein the key control section outputs the whole authentication information to the terminal in addition to the portion of the authentication information.

6. The communication system according to claim 2,
wherein the predetermined condition includes a condition that the authentication information is generated.

7. The communication system according to claim 1, wherein
the first change section changes the first encryption key by changing the first key generation logic, and
the second change section changes the second encryption key by changing the second key generation logic.

8. The communication system according to claim 1,
wherein, as the predetermined process, the second device performs a process of checking the encrypted information that is encrypted by using the first encryption key, against encrypted information that is encrypted by using the second encryption key.

9. The communication system according to claim 1,
wherein, as the predetermined process, the second device performs a process of using the second encryption key and decrypting the encrypted information that is encrypted by using the first encryption key.

10. The communication system according to claim 1,
wherein each of the first condition and the second condition includes a condition that a predetermined time has elapsed or a condition that a number of encrypted communications between the first device and the second device reaches a predetermined number.

11. A control device capable of communicating with a first device and a second device,
- wherein, when the first device transmits encrypted information that is encrypted by using a first encryption key to the second device, the second device executes a predetermined process based on the encrypted information and a second encryption key that is common to the first encryption key,
- the control device includes an authentication section and a key control section configured to control change of the first encryption key by a first change section in a case where a first condition is satisfied and the second encryption key by a second change section in a case where a second condition is satisfied, the second condition being common to the first condition,
- the first encryption key is generated on a basis of first key generation logic that is logic indicating a procedure of generating the first encryption key and first information,
- the second encryption key is generated on a basis of the first information and second key generation logic that is common to the first key generation logic,
- the first condition includes a condition that second information is input into the first change section,
- the second condition includes a condition that the second information is input into the second change section,
- in a case where the first condition is satisfied, the first change section changes the first encryption key into a third encryption key that is generated on a basis of the first key generation logic and the second information,
- in a case where the second condition is satisfied, the second change section changes the second encryption key into a fourth encryption key that is generated on a basis of the second key generation logic and the second information,
- a first one of the first device and the second device is a terminal,
- a second one of the first device and the second device is a communication device that performs wireless communication with the terminal,
- the authentication section generates authentication information used to authenticate the terminal, and
- the key control section outputs a portion of authentication information to the first device as the second information, and outputs the portion of the authentication information to the second device as the second information.

* * * * *